United States Patent [19]
Ujiie

[11] 3,835,916
[45] Sept. 17, 1974

[54] APPARATUS FOR ELECTROSLAG REMELTING TO PRODUCE TUBULAR BODIES

[75] Inventor: Akira Ujiie, Kobe, Japan

[73] Assignee: Mitsubishi Jukogyo Kabushik Kaisha, Tokyo, Japan

[22] Filed: Jan. 5, 1973

[21] Appl. No.: 321,305

[30] Foreign Application Priority Data
Jan. 17, 1972   Japan................................ 47-6215

[52] U.S. Cl................................ 164/252, 164/263
[51] Int. Cl........................................... B22d 27/02
[58] Field of Search.......... 164/52, 69, 70, 85, 252, 164/263

[56] References Cited
UNITED STATES PATENTS

| | | | |
|---|---|---|---|
| 3,507,968 | 4/1970 | Parsons.................................... | 13/9 |
| 3,683,997 | 8/1972 | Uziie et al............................. | 164/52 |

*Primary Examiner*—J. Spencer Overholser
*Assistant Examiner*—John E. Roethel
*Attorney, Agent, or Firm*—Cushman, Darby & Cushman

[57] ABSTRACT

The invention relates to apparatus suitable for use in the production of metallic tubes in which slag, scale and irregularities on the inner and outer walls of the metallic tube are removed immediately after the metallic tube is formed. The apparatus comprises the following features:

1. a mould which comprises a core mould and an outer mould, the core mould and the outer mould being situated to delimit an annular space therebetween;

2. means for continuously feeding a plurality of metal electrodes into the annular space;

3. means for supplying an electric current to the metal electrodes to melt the electrodes and form a bath of molten metal in the annular space;

4. drawing means for continuously drawing from the mould a metallic tube as it is formed on cooling of the molten metal in the mould; and 5. cutting means for removing slag, scale and irregularities on the inner andpreferably also the outer wall of the mecallic tube immediately after the metallic tube is withdrawn from the mould by the drawing means.

7 Claims, 4 Drawing Figures

APPARATUS FOR ELECTROSLAG REMELTING TO PRODUCE TUBULAR BODIES

FIELD OF THE INVENTION

This invention relates to apparatus for producing tubular bodies such as metallic tubes by the electroslag re-melting of metal electrodes.

BACKGROUND OF THE INVENTION

There is known in Japan an apparatus as shown in FIGS. 1 and 2 of the accompanying drawings. In this apparatus a plurality of metal electrodes 1, each made of the same material as that of the metallic tube to be produced, are supported vertically by a supporting member, not shown, in an arrangement substantially corresponding to the cross-sectional shape of the metallic tube and in suitably spaced relation to each other, as shown in FIG. 2. The metal electrodes 1 are lowered at a suitable rate by feeding means 4 which is driven by driving means, not shown. A water-cooled metal mould comprises a water-cooled core mould 2 having cooling water inlet and outlet ports and a water-cooled outer mould 3 having cooling water inlet and outlet ports. The water-cooled outer mould is arranged concentrically with and surrounds the core mould 2. The core mould 2 and outer mould 3 define therebetween an annular moulding space. The upper portion of the annular moulding space is in the shape of a hopper to retain, in operation, a molten slag bath S therein. The intermediate portion of the annular space provides a portion to retain molten metal therein. The horizontal cross-sectional dimensions of this intermediate, parallel-walled portion are equal to those of the desired metal tube. The lower portion of the annular space expands outwardly and downwardly. The metal electrodes 1 are arranged immediately above the upper portion of the annular space and the lower end of each electrode extends into this portion. There are also provided drawing means 6 with a start piece 6a which is vertically movable and is supported by a machine frame F so that the start piece 6a can be inserted into the aforesaid intermediate portion of the annular space of the mould. An electric current can be supplied to each metal electrode 1 from a power source 18 through a brush 19. In producing a metallic tube by means of the apparatus described above, the start piece 6a of the drawing means 6 is first inserted into the intermediate, molten metal retaining portion of the mould and, after the upper, molten slag bath retaining portion is filled with a large amount of flux, each metal electrode 1 is lowered by the feeding means 5. A current is supplied from the power source 18 to the metal electrodes 1 through the respective brushes 19 to melt the flux to form a molten slag bath S in the upper, molten slag bath retaining portion. Once the molten slag bath S has been thus formed, each metal electrode 1 is continuously fed into the molten slag bath S and melted therein. The molten metal M accumulates in the intermediate, molten metal retaining portion and solidifies therein on being cooled by the metal mould, to form a metallic tube 5. The metallic tube 5 thus formed is continuously withdrawn downwardly by the drawing means 6 and the start piece 6a.

In the above-described apparatus the metallic tube formed by the electroslag re-melting of the metal electrodes within the metal mould is withdrawn from the metal mould as it is formed, so that the inner and outer surfaces of the metal tube have concave and convex irregularities of the order of ± 1 mm formed thereon and slag and scale attached thereto. Therefore, it has been customary in Japan to produce metal tubes whose wall thickness is about 2 mm larger than the prescribed thickness of the product tube, in anticipation of a thickness reduction in a final surface finishing operation. Thus, the apparatus has the disadvantages that use of the metallic material is not very economical and that much time and labour are required for the slag and scale removing operation. The slag and scale removing operation is extremely difficult, particularly when the length of the product tube is, say, about 10 meters. In the case, for example, of pyrolysis tubes used in petrochemical apparatus, particularly in the production of ethylene, a large amount of carbon deposits on the inner surface of the tube during reaction with naphtha, which causes carbonization of the tube material and reduction in wall thickness of the tube. It is said that finishing the inner surface of the tube as smoothly as possible is an effective measure to avoid this carbon deposition. Therefore, it has been the practice to subject the inner surface of a tube to honing or polishing subsequent to the production of the tube. However, in the case of a pyrolysis tube of the type described, because its length may be about 10 meters and its diameter 38 – 150 mm, the honing or polishing of the tube is quite cumbersome and calls for much time and labour, which adds to the cost of the product tube. Modifier tubes, called reformer tubes, which are used for the production of hydrogen, ammonia, etc., in petrochemistry, also require slag or scale to be removed from the inner surface thereof. Hence, much time and labour have been required for this operation, similar to the case of the pyrolysis tube. Furthermore, the recent tendency of these tubes to become smaller and smaller in diameter and thickness has rendered more difficult the honing, or slag or scale removing operation, mentioned above.

SUMMARY OF THE INVENTION

According to the present invention there is provided apparatus suitable for use in the production of metallic tubes, which apparatus comprises:

1. a mould which comprises a core mould and an outer mould, the core mould and the outer mould being situated to delimit an annular space therebetween;
2. means for continuously feeding a plurality of metal electrodes into the annular space;
3. means for supplying an electric current to the metal electrodes to melt the electrodes and form a bath of molten metal in the annular space;
4. drawing means for continuously drawing from the mould a metallic tube as it is formed on cooling of the molten metal in the mould; and
5. cutting means for removing slag, scale and irregularities on the inner and also preferably the outer wall of the metallic tube immediately after the metallic tube is withdrawn from the mould by the drawing means.

BRIEF DESCRIPTION OF THE DRAWINGS

The invention will be further illustrated by reference to the accompanying drawings showing, by way of example, an embodiment of the invention, in which:

FIGS. 1 and 2 illustrate briefly the apparatus known in Japan and referred to above, of which:

FIG. 1 is a vertical sectional view of the apparatus; and

FIG. 2 is a plan view showing the arrangement of the metal electrodes; and

FIGS. 3 and 4 shown an embodiment of the apparatus according to the present invention, of which:

FIG. 3 is a vertical sectional view; and

FIG. 4 is a plan view showing the arrangement of the metal electrodes.

Referring to FIGS. 3 and 4, those parts similar to parts of the apparatus described with reference to FIGS. 1 and 2 are given the same numbers as in FIGS. 1 and 2. Thus reference numeral 1 designates a plurality of metal electrodes, 2 a water-cooled core mould, 3 a water-cooled outer mould, 4 feeding means, 6 drawing means, 6a a start piece, 18 a power source, and 19 brushes, and reference symbol F designates a machine frame. The construction, functions and relative arrangement of these parts are the same as those in the apparatus described with reference to FIGS. 1 and 2, except for the construction of the water-cooled core mould 2, and detailed descriptions thereof are omitted. The water-cooled core mould 2 has a vertical hole 2a formed through the centre thereof. A vertical shaft 7 extends through the vertical hole 2a and is rotatably supported by bearings 2b. The top end of the vertical shaft 7 is supported rotatably by the machine frame F through a bearing and has a pulley 9 fixedly mounted thereon. The lower end of the vertical shaft 7 projects downwardly from the lower surface of the water-cooled core mould 2 and has a cutter 8 removably connected thereto for cutting away slag, scale and irregularties on the inner peripheral wall of a metal tube 5 to be withdrawn from the metal mould.

Figure 1:
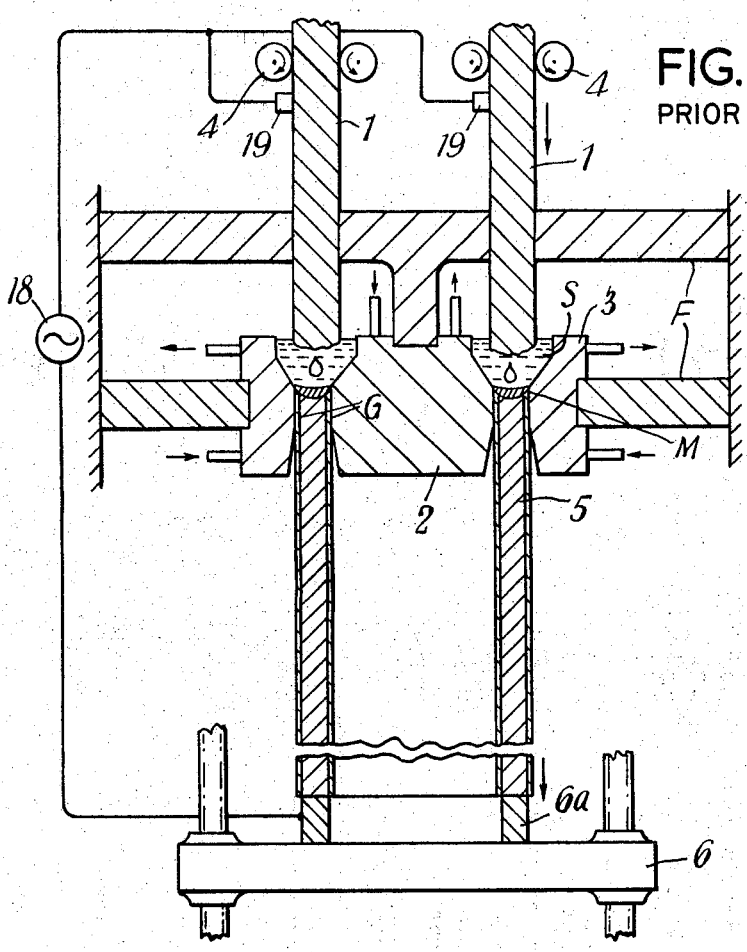
Figure 2:
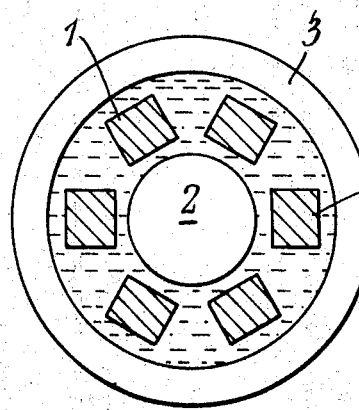

A motor 12 is mounted at a suitable location on the machine frame and a belt 10 is engaged around the pulley 9 and a pulley 11 fixedly mounted on the drive shaft of the motor 12. Thus, it will be understood that the cutter 8 is driven from the motor 12 through the vertical shaft 7 together with said vertical shaft. An annular member 13 having a rack R formed along the outer peripheral surface thereof is fixedly mounted on a fixed bed L which is concentric with the vertical shaft 7. A trolley block 14 is rollably mounted on the annular member 13. This trolley block 14 is provided with a motor 17 which has a pinion 16 fixedly mounted on the drive shaft thereof in meshing engagement with the rack R of the annular member 13. The arrangement is such that, when the motor 17 is set in motion, the trolley block 14 will slidingly move on the annular member 13. The trolley block 14 has a cutter 15 connected thereto, the cutting edge of the cutter 15 being positioned opposite to the cutting edge of the cutter 8, for cutting the outer peripheral wall of the metallic tube 5 to be withdrawn from the metal mould. The positions of the cutters 8, 15 are suitably adjustable. Reference numeral 14a designates a guide member provided on the trolley block 14.

In the operation of the apparatus described above, as the metallic tube 5 formed in the metal mould is continuously drawn therefrom by the drawing means 6, the cutter 8 driven from the motor 12 cuts the inner peripheral wall of the metallic tube 5, removing slag or scale attached to the wall and simultaneously finishing the wall to a flat and smooth surface. The outer peripheral surface of the metallic tube 5 is cut and finished by the cutter 15 of the trolley block 14 which is slidingly driven on the annular member 13 by the motor 17. In this case, the rate of rotation of the cutter 8 and the speed of travel of the cutter 15 are selected optionally according to the material and dimensions of the metallic tube 5 and the drawing speed. The cutting positions of the cutters 8 and 15 are suitably selected in consideration of the temperature of the metallic tube 5 and other cutting conditions.

Figure 3:
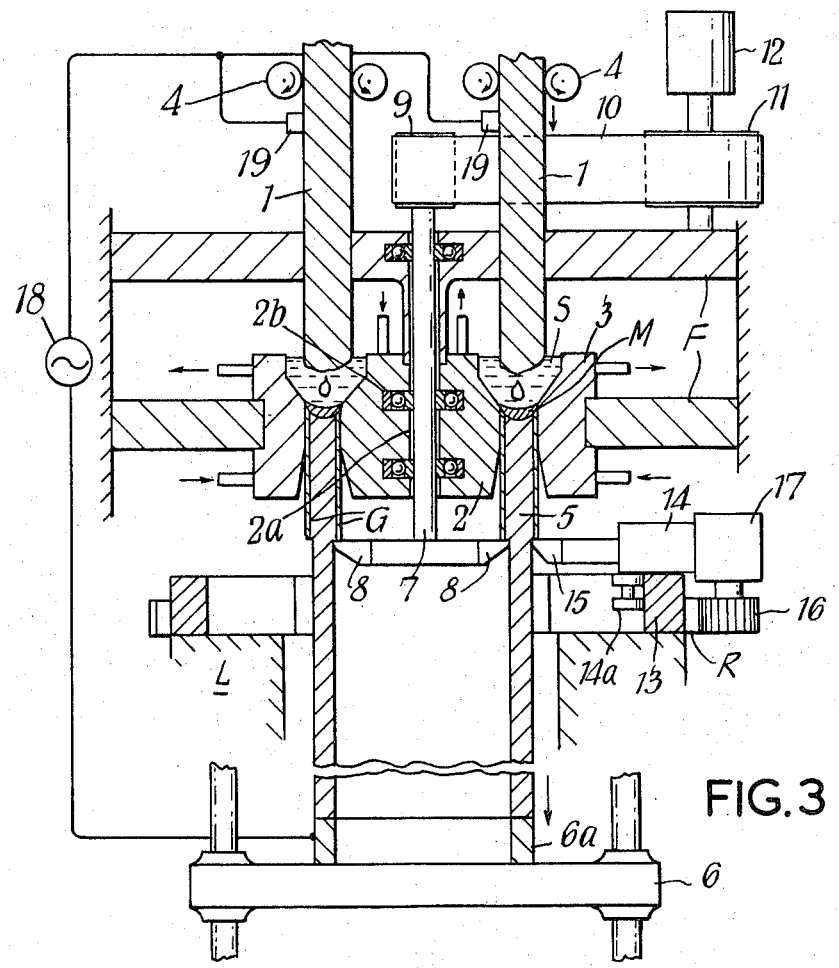
Figure 4:
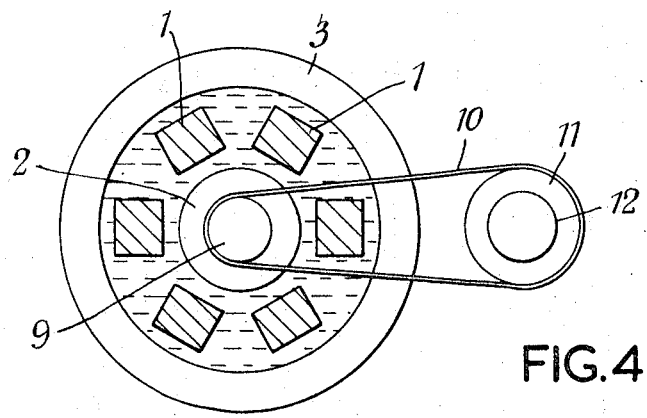

By means of the apparatus illustrated in FIGS. 3 and 4, the following advantages can be obtained:

1. Since the inner and outer peripheral walls of the metallic tube continuously being withdrawn from the metal mould are cut immediately after formation of the tube in the mould, the labour required for removing the concave and convex irregularities and slag or scale, which has been required with the previous apparatus, can be eliminated and hence the production cost of the tube can be reduced.

2. The cutting operation is easy because it is effected while the metallic tube is at a high temperature, in a red-hot state.

3. The finishing of the tube can be achieved much more easily than heretofore, even when the length of the tube is considerable.

4. By properly designing the metal mould and cutters, finishing of tubes having small diameters and thicknesses can be achieved with relative ease.

What we claim is:

1. Apparatus suitable for use in the production of metallic tubes, which apparatus comprises:
    1. a mould which comprises a core mould and an outer mould, the core mould and the outer mould being situated to delimit an annular space therebetween;
    2. means for continuously feeding a plurality of metal electrodes into the annular space;
    3. means for supplying an electric current to the metal electrodes to melt the electrodes and form a bath of molten metal in the annular space;
    4. drawing means for continuously drawing from the mould a metallic tube as it is formed on cooling of the molten metal in the mould; and
    5. cutting means for removing slag, scale and irregularities on the inner wall of the metallic tube immediately after the metallic tube is withdrawn from the mould by the drawing means, the cutting means for the inner wall of the metallic tube comprising a rotatable cutter on a rod extending through the centre of the core mould.

2. Apparatus as claimed in claim 1 which comprises cutting means for removing slag, scale and irregularities on the outer wall of the metallic tube immediately after the metallic tube is withdrawn from the mould by the drawing means.

3. Apparatus as claimed in claim 1 in which the cutting means for the outer wall of the metallic tube comprises a cutter mounted on a trolley block which is movable around an annular member through which, in operation, the metallic member passes as it is withdrawn from the mould by the drawing means.

4. Apparatus as claimed in claim 2 in which the core mould and the outer mould are adapted by being provided with conduit means, to be water-cooled.

5. Apparatus suitable for use in the production of metallic tubes, which apparatus comprises:
    1. a mould which comprises a core mould and an outer mould, the core mould and the outer mould being situated to delimit an annular space therebetween;
2. means for continuously feeding a plurality of metal electrodes into the annular space;
3. means for supplying an electric current to the metal electrodes to melt the electrodes and form a bath of molten metal in the annular space;
4. drawing means for continuously drawing from the mould a metallic tube as it is formed on cooling of the molten metal in the mould;
5. cutting means for removing slag, scale and irregularities on the inner wall of the metallic tube immediately after the metallic tube is withdrawn from the mould by the drawing means;
6. cutting means for removing slag, scale and irregularities on the outer wall of the metallic tube immediately after the metallic tube is withdrawn from the mould by the drawing means, the cutting means for the outer wall of the metallic tube comprising a cutter mounted on a trolley block which is movable around an annular member through which, in operation, the metallic member passes as it is withdrawn from the mould by the drawing means.

6. Apparatus as claimed in claim 2 in which the cutting means for the inner wall and that for the outer wall are provided at about the same level.

7. Apparatus suitable for use in the production of metallic tubes, which apparatus comprises:
1. a mould which comprises a core mould and an outer mould, the core mould and the outer mould being situated to delimit an annular space therebetween;
2. means for continuously feeding a plurality of metal electrodes into the annular space;
3. means for supplying an electric current to the metal electrodes to melt the electrodes and form a bath of molten metal in the annular space;
4. drawing means for continuously drawing from the mould a metallic tube as it is formed on cooling of the molten metal in the mould; and
5. cutting means for removing slag, scale and irregularities on the inner and outer walls of the metallic tube immediately after the metallic tube is withdrawn from the mould by the drawing means, said cutting means comprising:
a. a first cutter disposed within the metallic tube;
b. means for moving the first cutter circularly relative to the longitudinal axis of the metallic tube, with the first cutter in cutting engagement with slag, scale and irregularities on the inner wall of the metallic tube;
c. a second cutter disposed outside the metallic tube at about the same level as the first cutter; and
d. means for moving the second cutter circularly relative to the longitudinal axis of the metallic tube, with the second cutter in cutting engagement with slag, scale and irregularities on the outer wall of the metallic tube.

* * * * *